Aug. 10, 1971  J. R. HAMILTON  3,598,561

PLUNGER ACTUATING ASSEMBLY FOR GLASSWARE FORMING MACHINES

Filed June 25, 1968  5 Sheets-Sheet 1

Inventor:
Joseph R. Hamilton
By Bair, Freeman & Molinare Attys.

Aug. 10, 1971 J. R. HAMILTON 3,598,561
PLUNGER ACTUATING ASSEMBLY FOR GLASSWARE FORMING MACHINES
Filed June 25, 1968 5 Sheets-Sheet 2
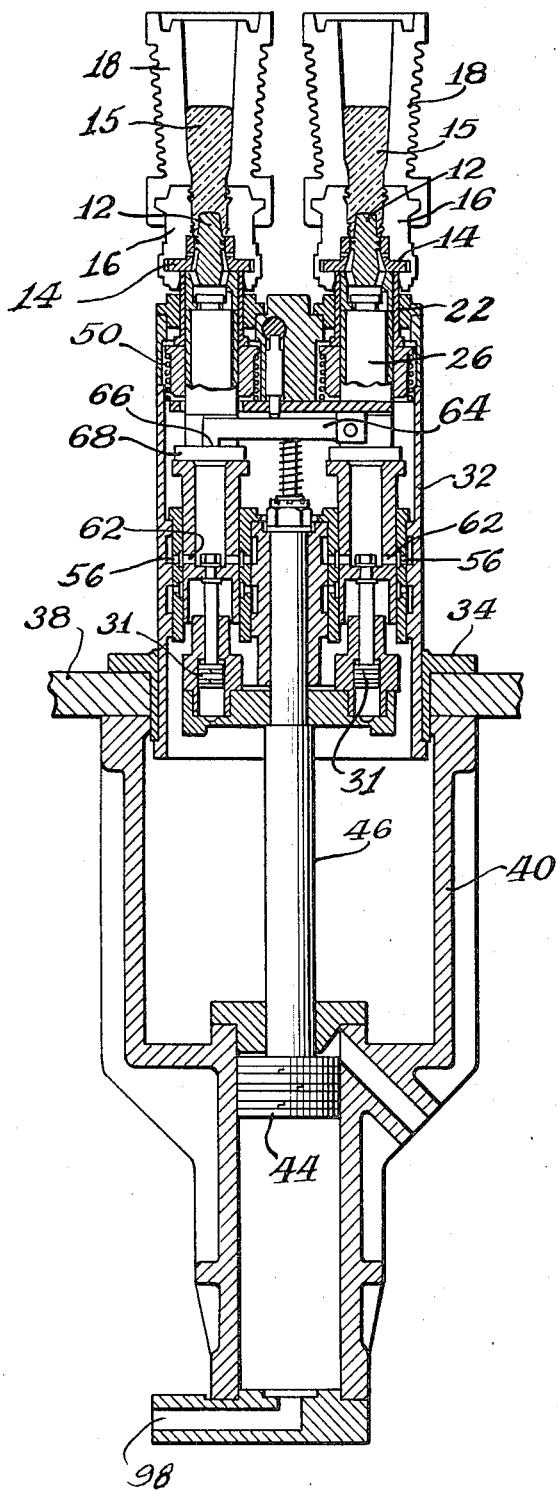
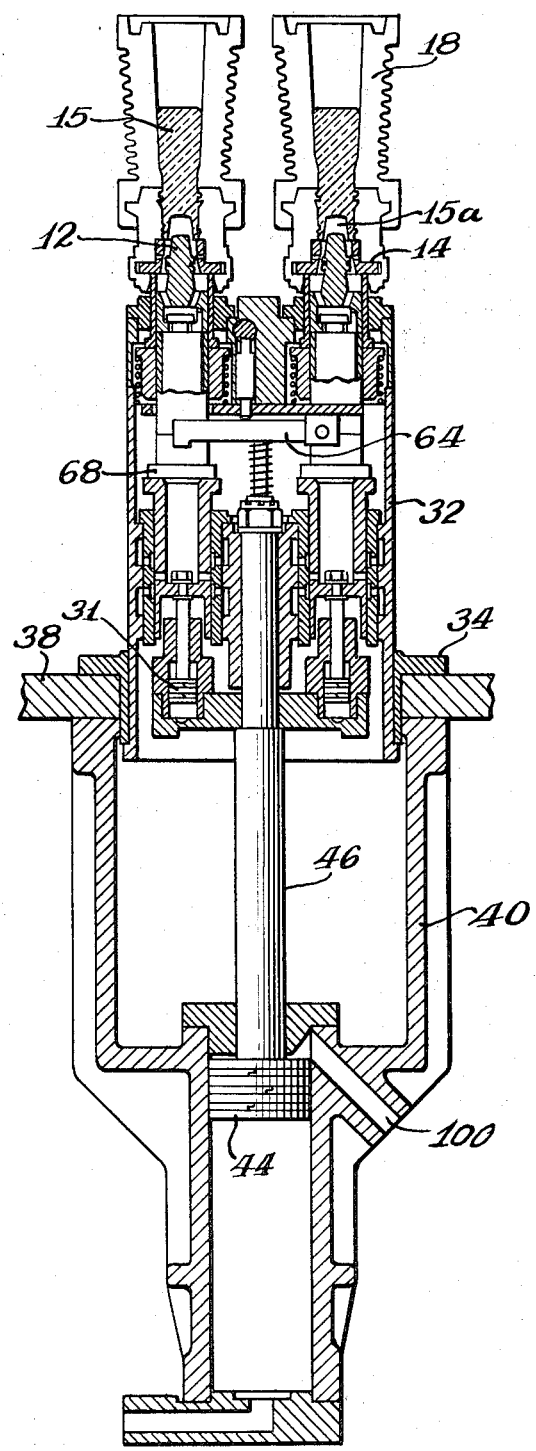
Inventor:
Joseph R. Hamilton
By Bair, Freeman & Molinare
Attys.

Aug. 10, 1971  J. R. HAMILTON  3,598,561
PLUNGER ACTUATING ASSEMBLY FOR GLASSWARE FORMING MACHINES
Filed June 25, 1968  5 Sheets-Sheet 3

Inventor:
Joseph R. Hamilton
By Bair, Freeman & Molinare Attys.

Aug. 10, 1971          J. R. HAMILTON          3,598,561
PLUNGER ACTUATING ASSEMBLY FOR GLASSWARE FORMING MACHINES
Filed June 25, 1968                    5 Sheets-Sheet 4
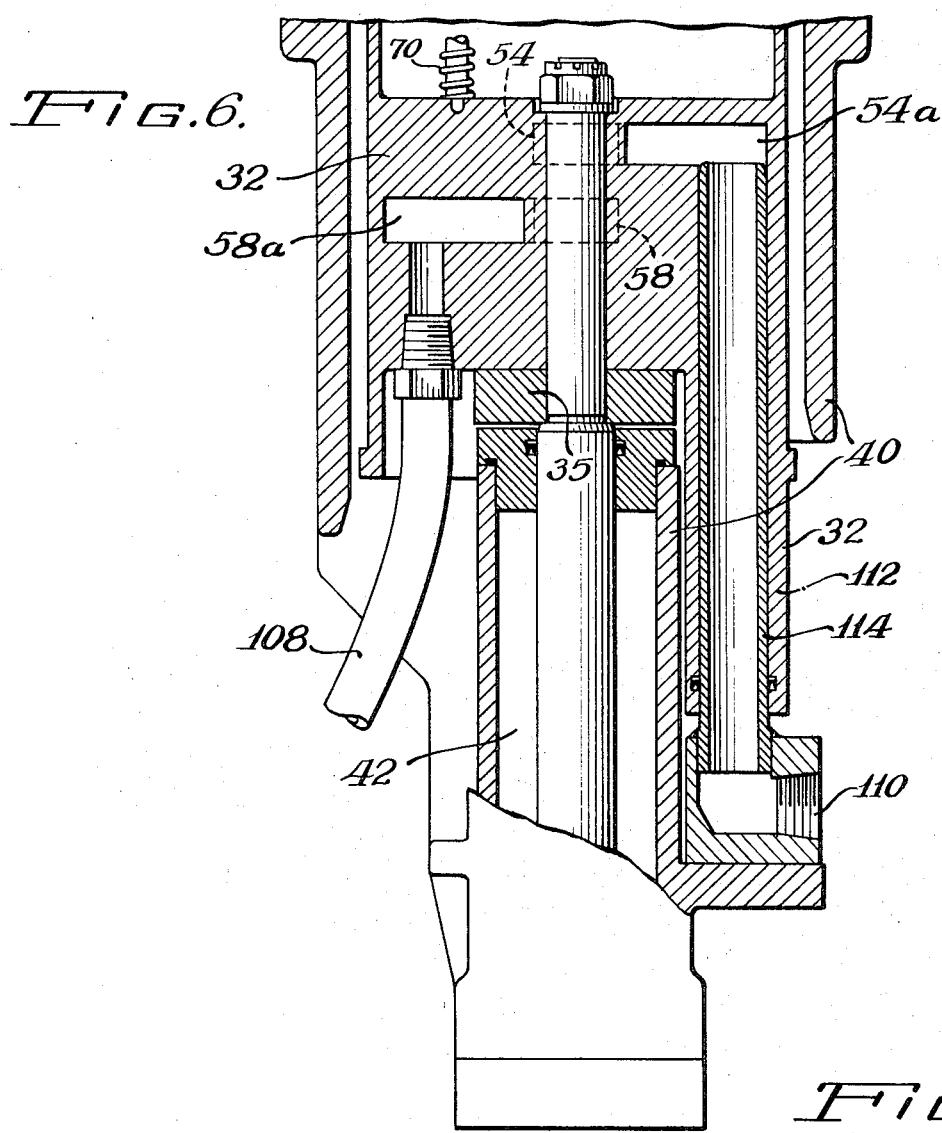
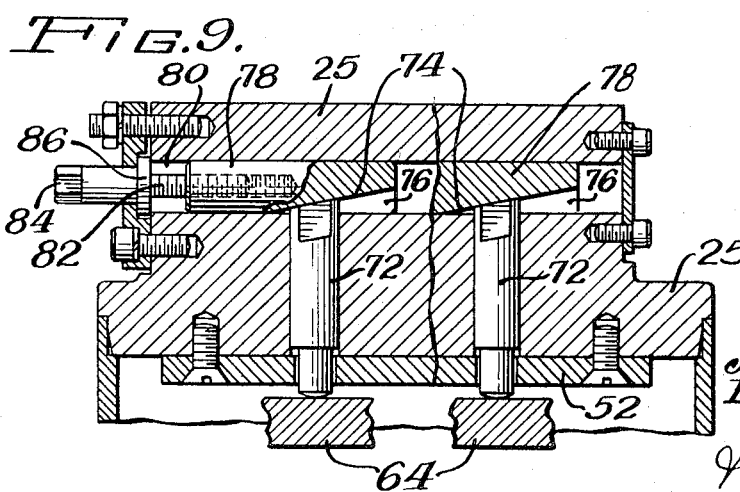
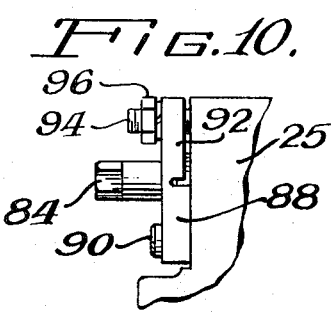
Inventor:
Joseph R. Hamilton
By Bair, Freeman
& Molinare
Attys.

Aug. 10, 1971 — J. R. HAMILTON — 3,598,561
PLUNGER ACTUATING ASSEMBLY FOR GLASSWARE FORMING MACHINES
Filed June 25, 1968 — 5 Sheets-Sheet 5
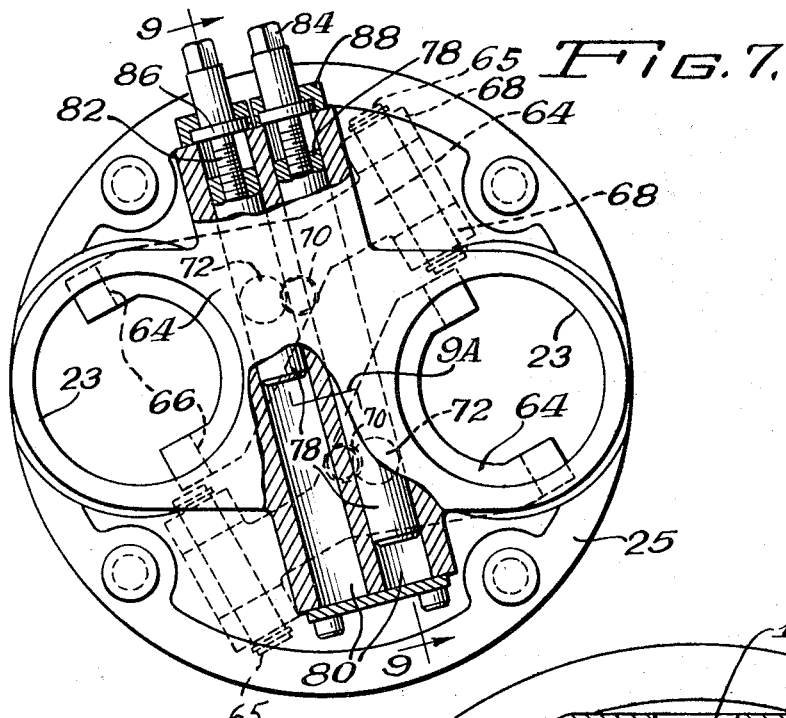
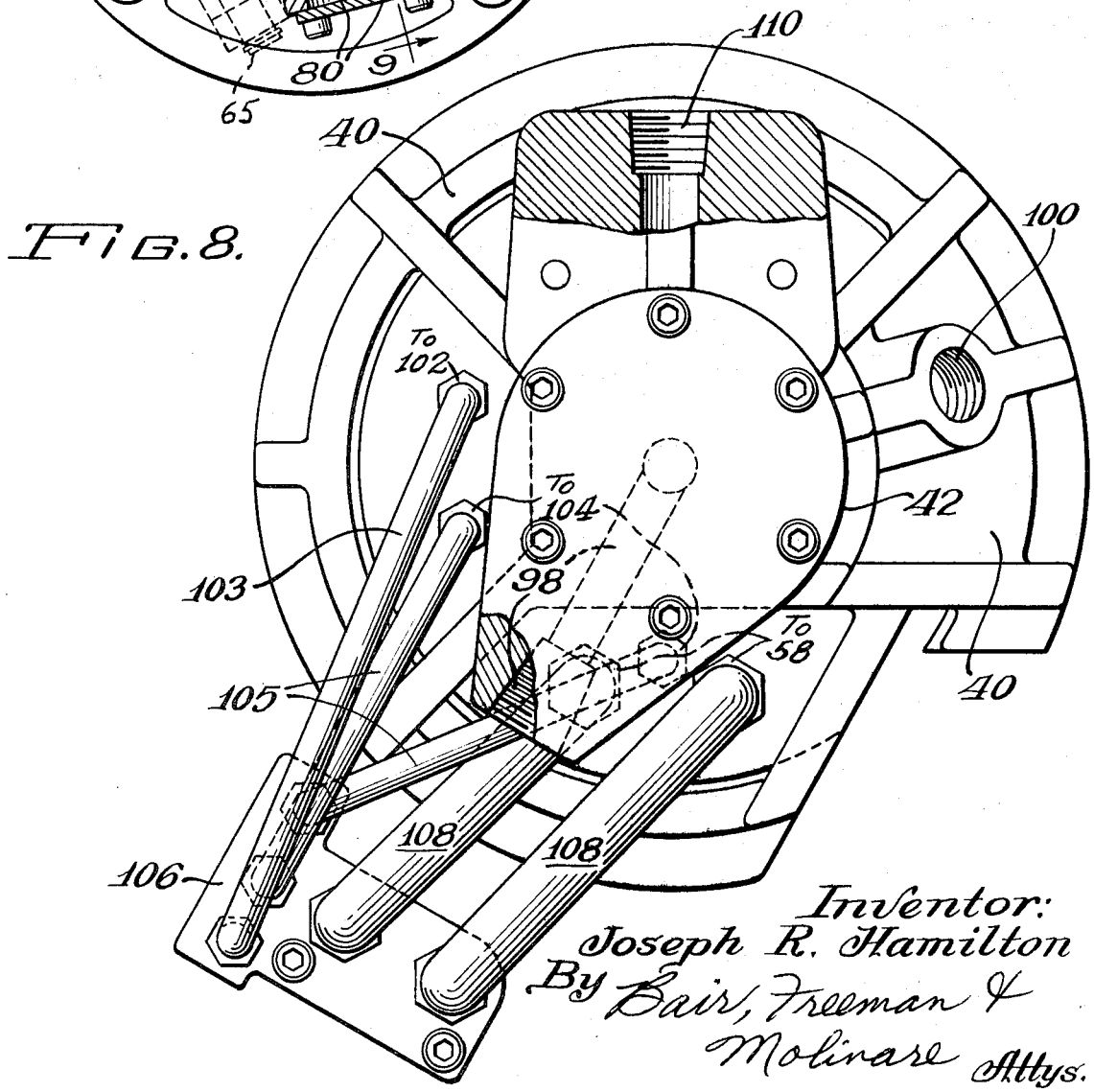
Inventor:
Joseph R. Hamilton
By Bair, Freeman & Molinare Attys.

United States Patent Office

3,598,561
Patented Aug. 10, 1971

3,598,561
PLUNGER ACTUATING ASSEMBLY FOR
GLASSWARE FORMING MACHINES
Joseph R. Hamilton, Anderson, Ind., assignor to
Lynch Corporation, Anderson, Ind.
Filed June 25, 1968, Ser. No. 739,759
Int. Cl. C03b 9/26
U.S. Cl. 65—233                                          11 Claims

ABSTRACT OF THE DISCLOSURE

An actuating assembly for a neck-forming plunger of a glassware forming machine which operates to position the plunger relative to a neck ring and a guide ring to secure vacuum settling of a glass gob in a parison mold, positive counterblow of the parison and internal cooling thereof. The assembly is particularly adapted for multiple gob glassware forming, and provides individual height adjustment for the plungers and individual control of the vacuum and counterblow operations for each plunger, and thus compensates for gob temperature variations since the degree of vacuum and the air pressure for counterblow can be varied, all of which can be accomplished without shutdown of the machine during adjustments.

BACKGROUND OF THE INVENTION

Pawling et al. Pat. No. 1,670,821, Sears Pat. No. 1,679,502, Rowe Pat. No. 2,063,463 and Howard Pat. No. 2,081,857 disclose the general construction and operation of plungers while my own prior Pat. No. 3,272,612 shows a similar construction together with an actuating mechanism therefor over which my present mechanism is an improvement, and which is particularly adaptable for glassware forming machines of the type shown in Youkers Pat. No. 2,874,516 and my Pat. No. 3,060,707.

One object of my present invention is to provide an actuating assembly for multiple plunger glassware forming mechanism which comprises a main piston in a main cylinder and a carrier supported by the main piston and provided with a cylinder for each neck-forming plunger, the plungers being movable relative to the carrier by pistons in the last-mentioned cylinders which carry the plungers.

Another object is to provide a hollow plunger stem for each neck-forming plunger which forms part of the piston-plunger combination and are adaptable for the passage of air therethrough, a porting arrangement as between the carrier and the plunger stems being such as to provide for vacuum connections to the interior of the plunger stem in one position thereof relative to the carrier and counterblow connections thereto in another position thereof relative to the carrier.

Still another object is to provide a neck-forming plunger for coaction with a neck ring, which, when in one position relative thereto permits a vacuum to be drawn inside the neck ring to vacuum settle a gob of glass into a parison mold, and when in another position relative thereto permits counterblow air to be discharged through the neck ring into the parison to blow it to shape in the parison mold.

A further object is to provide a plunger actuating assembly in which a single main piston carries individual cylinders for individual pistons of individual plungers, the main piston being operable to elevate the actuating assembly into a position of coaction with parison molds and the secondary pistons being operable within their cylinders to further elevate the plungers and depress them for vacuum settle and counterblow operations respectively including the relative positions of ports in porting arrangements for vacuum settle in the first instance and counterblow in the second instance.

Still a further object is to provide the plunger actuating assembly with sleeves that enter guide rings of neck ring and parison mold assemblies, and cooperate with the guide rings under the bias of springs prior to full entry of the plungers into the guide rings and neck rings, after which the vacuum settle and counterblow operations take place with subsequent lowering of the entire assembly by the main piston after the parisons are blown and when they are ready to pass on to a finish blow station.

An additional object is to provide novel stop means for the neck-forming plungers in their elevated positions which are individually adjustable for the respective plungers so that each can be nicely adjusted relative to its cooperating guide ring and neck ring, and which arrangement is particularly desirable in case the different parison molds are designed for the blowing of different types and/or sizes of bottles.

Mor particularly, it is an object of my invention to provide individual adjusting means for the neck-forming plungers which include pivoted yokes having stop pads for stop flanges of the plungers and which yokes are individually adjustable in micrometric manner.

Still another object is to provide adjustment for the yokes in the form of thrust pins thereagainst opposed by spring mechanism, the thrust pins having inclined upper ends interfitting with inclined surfaces of slides which are adjusted by screw threaded means, the arrangement being such that adjustment can be effected without stopping the operation of the glasswaree forming machine.

BRIEF SUMMARY OF THE INVENTION

My neck-forming plunger actuating assembly includes a main cylinder-and-piston mechanism which carries secondary cylinder-and-piston mechanisms, one for each plunger, and which secondary mechanisms include porting arrangements for vacuum settle and counterblow operations. The neck-forming plungers coact with guide rings and neck rings, and may be individually adjusted relative thereto by fluid under pressure acting in one direction and adjustable stops acting in the opposite direction whereby the fluid pressure moves certain parts of the plunger actuating mechanism against the stops, and the plungers are thereby accurately positioned relative to the parts of the glassware forming machine with which they cooperate. A novel arrangement of thrust pins and screw-actuated slides having coacting inclined surfaces provides for fine adjustment of each individual plunger with respect to the adjacent coacting parts of the glassware forming machine.

BRIEF DESCRIPTION OF THE DRAWINGS

FIGS. 2, 3, 4 and 5 are views somewhat similar to FIG. 1 (except semidiagrammatic) showing the following:

FIG. 2 the parts in a vacuum settle position;
FIG. 3 the parts in a post-vacuum settle and a pre-counterblow position;
FIG. 4 the parts in a counterblow position;
FIG. 5 in a post-counterblow position the same as in FIG. 1; and FIGS. 2, 3, 4 and 5 also show the cooperation of my plunger actuating assembly with parison molds and the usual adjacent elements of a glassware forming machine;

FIG. 6 is a vertical view on the line 6—6 of FIG. 1, showing certain pneumatic connections of my actuating assembly;

FIG. 7 is an enlarged plan view of the actuating mechanism of FIG. 1 with portions thereof broken away and other portions shown in section to illustrate details of an adjustable stop mechanism;

FIG. 8 is a bottom plan view of FIG. 1, on an enlarged scale;

FIG. 9 is a sectional view on the line 9–9A–9 of FIG. 7; and

FIG. 10 shows a portion of FIG. 9 in side elevation.

DESCRIPTION OF THE PREFERRED EMBODIMENTS

Figure 1:
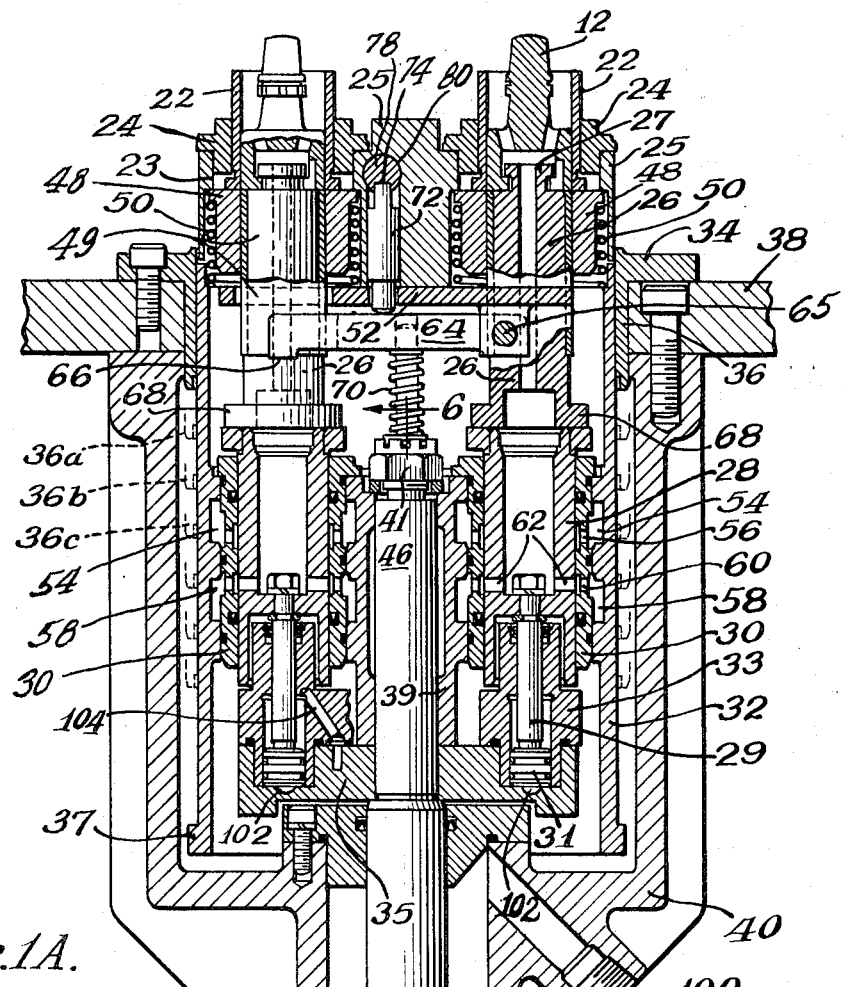
FIG. 1 is a vertical sectional view through a plunger actuating assembly for glassware forming machines embodying my invention, the parts being shown in a post-counterblow position.
Figure 1A:
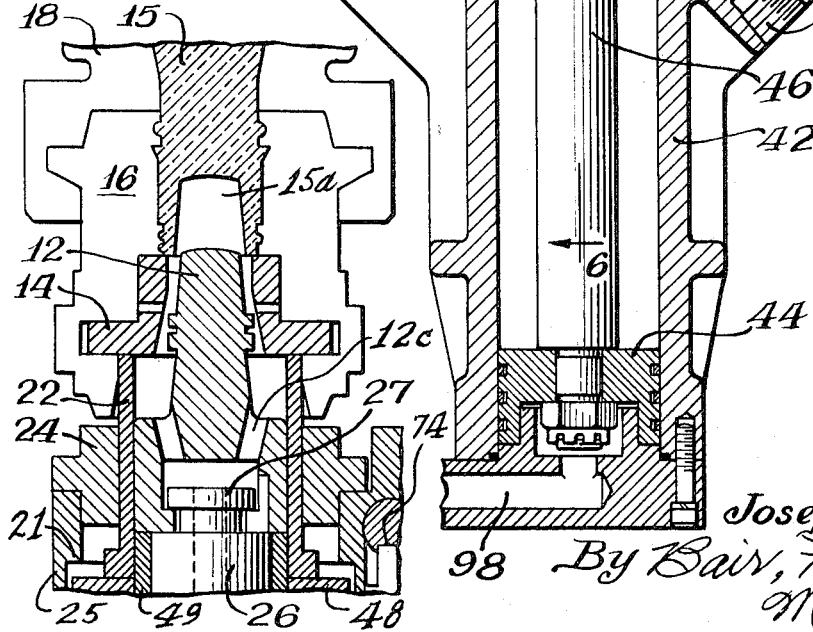
FIG. 1A is an enlarged cross section of portions of FIGS. 1 and 3 to show details.
Figure 4:
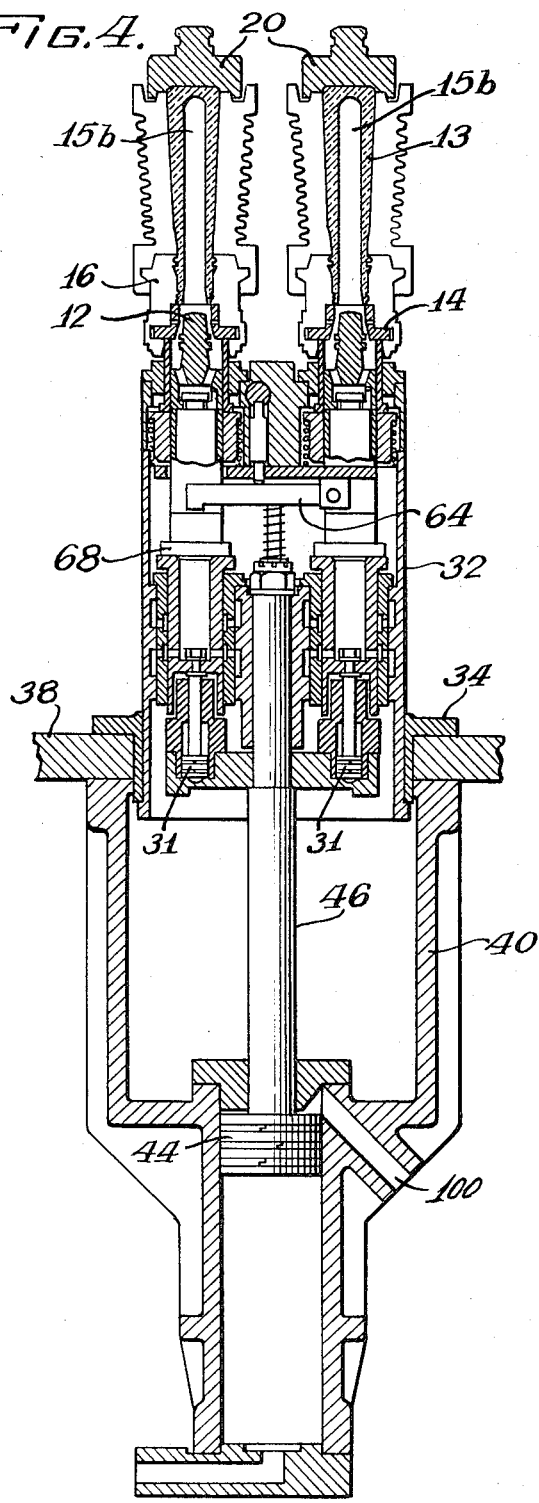

On the accompanying drawings, and in reference to FIGS. 1 and 1A particularly, I have used the reference numeral 12 to indicate neck-forming plungers for a glassware forming machine. These plungers cooperate with guide rings 14 and split neck rings 16 in forming the neck or "finish" for a parison 13 (as shown in FIG. 4), whereas in FIG. 1A the gob of glass 15 prior to parison forming is illustrated.

Describing now a single assembly such as shown in FIG. 1A, the guide ring 14 is floatingly carried in the neck ring 16 whch is made in two halves that are separable for releasing the finished ware, as shown in the Youkers patent hereinbefore referred to. A split parison mold 18 is shown (completely in FIG. 4 together with the usual baffle 20). A sleeve 22 surrounds the plunger 12 and is vertically slidable in a sleeve retainer 24 received in a bore 23 of a housing head 25. Each sleeve 22 rests on a flanged bushing 48 normally biased upwardly by a spring 50, the lower end of which rests against a cover plate 52 on the bottom of the housing head 25. A slide sleeve 49 surrounds the plunger stem 26 and is slidable in the bushing 48 (and the sleeve 22 as shown in FIGS. 1A, 2 and 3).

A hollow secondary plunger stem 26 is operatively connected to the plunger 12 through the medium of a head 27 on the stem, and the secondary plunger stem is connected to the upper end of a hollow primary plunger stem 28. The stem 28 is slidable in a primary plunger stem guide sleeve 30 and is connected to the upper end of a primary plunger stem piston rod 29 terminating in a primary plunger stem piston 31 vertically slidable in a primary plunger stem cylinder 33. The guide sleeve 30 is secured in, and suitably O-ring sealed relative to, a plunger housing 32 on the upper end of which the head 25 is secured. The housing 32 is vertically slidable in a stop sleeve 36 of a stop plate 34. As shown by dotted lines 36a, 36b, etc. in FIG. 1, stop sleeves 36 of different lengths may be provided to variably limit the upward stroke of the housing 32 which has a stop flange 37 on the lower end thereof to engage the lower end of the stop sleeve 36 of whatever length. The stop sleeves are readily interchangeable in an obvious manner to suit the size of the parison being blown.

The stop plate 34 is secured to a mounting base 38 which actually is the top wall of a hydraulic fluid housing or reservoir as shown in the Youkers and Hamilton patents, and the housing 32 is enclosed in a plunger housing cylinder 40 which is stationary relative to the mounting base 38.

A main cylinder 42 forms a downward extension of the plunger housing cylinder 40 and has slidable therein a main piston 44 having an upwardly extending main piston rod 46. A carrier plate 35 is mounted against a shoulder of the piston rod 46 as shown in FIG. 1 and the plunger housing 32 has a central hub 39 above the carrier plate, both the housing 32 and the plate being secured to the piston rod 46 as by a nut 41. Accordingly, the elements 44, 46, 35 and 32 may be elevated as a unit from the position shown in FIG. 1 by suitable flow of fluid under pressure to the cylinder 42 as will hereinafter appear.

Additionally, the pistons 31, the piston rods 29, the plunger stems 28 and 26, and the neck-forming plungers 12 may be elevated with respect to the housing 32 and the guide sleeves 30 by suitable flow of hydraulic fluid to the cylinders 33 as will hereinafter appear.

A vacuum cavity 54 and a counterblow cavity 58 are formed in the plunger housing 32, and the primary plunger stem guide sleeve 30 has vacuum ports 56 and counterblow ports 60, respectively, communicating therewith. These are provided to coact with transfer ports 62 during certain positions of the primary plunger stem 38 with respect to the guide sleeve 30 as will be described in connection with FIGS. 2, 3, 4 and 5 during the parison forming portion of the operating cycle of the glassware forming machine.

In multiple gobbing operations (or double gobbing as herein disclosed) it is desirable to have individual adjustment for the neck-forming plungers 12, and this is secured by means of stop yokes 64, one for each plunger stem 26 as shown in FIGS. 1, 7 and 9. Each yoke is pivoted as at 65 to ears 68 which depend from the cover plate 52, and the yokes terminate in stop pads 66. Each secondary plunger stem 26 has a stop flange 68 adapated at time to be spaced therefrom as in FIGS. 1, 3, 4 and 5 and at other times to engage the stop pads 66 as shown in FIG. 2. Each yoke is spring biased upwardly (see FIG. 1) by a spring 70 surrounding a guide pin for the spring in opposition to an adjusting plunger 72 vertically slidable in the head 25. The upper end of each adjusting plunger 72 is inclined as shown in FIG. 9 to coact with a similarly inclined surface forming the bottom of a groove in an adjusting slide 78. The slide 78 is in the form of a pin slidable in a bore 80 in the head 25. To accomplish the sliding action, an adjusting screw 82 is threaded into one end of the adjusting slide 78 and terminates exteriorly of the housing head 25 in an adjusting screw head 84 to which a wrench may be applied for adjustment purposes. The screw 78 and its head 84 have a flange 86 for locking purposes enclosed within a lock block 88 having one end secured to the head 24 as by a cap screw 90. Approximately one-half of the lock block 88 is relieved with respect to the adjacent surface of the head 25, and a lock screw 94 extends therethrough and is threaded into the head. A lock nut 96 on the lock screw 94 when tightened springs the relieved end 92 in an obvious manner for pinching the edge of the flange 86 to retain any adjustment made, and can be loosened for permitting subsequent adjustments when required.

The mechanism described in detail in the foregoing paragraph is arranged as in FIG. 7 so that it lies substantially within the upwardly projected outline of the plunger housing 32 and its head 25. This is desirable for compactness without projection into the way of other elements of the glassware forming machine. To accomplish the compact arrangement disclosed, the slides 78 are arranged side by side between the bores 23 for the sleeve retainers 24. The two levers 64 then extend in opposite directions as illustrated with the pivot pin 66 of each one substantially radially with respect to the opposite bore 23. The adjusting plungers 72 are likewise between the bores 23 and the springs 70 opposite the plungers 72 are slightly out-of-alignment therewith as shown in dotted lines in FIG. 7. The entire arrangement provides for compactness as required in an installation of the kind disclosed. For convenience of individual adjustment from a common point, both adjusting screw heads 84 extend from the same ends of the bores 80. Since the adjusting mechanisms are carried by the head 25, and it reciprocates vertically with the plunger housing 32, the adjustments must be effected (without shutdown of the glassware forming machine) during the vertical reciprocations thereof, not an unusual nor difficult procedure by the operators of glassware forming machines.

To actuate the main piston 44 in the main cylinder 42, a constant low pressure inlet 98 and a high pressure inlet 100 are provided respectively below and above the piston. By furnishing constant low pressure hydraulic fluid to the inlet 98, the fluid acts as a spring to normally elevate the piston 44 in the cylinder 42 while timed supply of high pressure hydraulic fluid to the inlet 100 depresses the piston as to the position shown in FIGS. 1 and 5.

Figure 5:
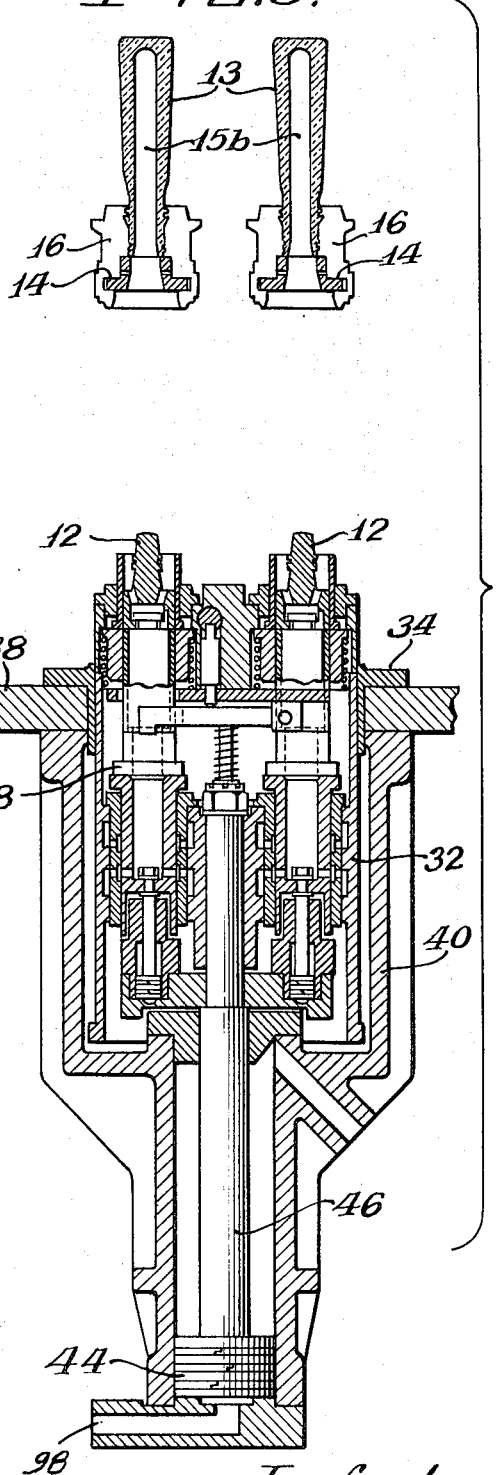

Similarly, each piston 31 normally biased upwardly by hydraulic fluid under constant low pressure to inlet 102 of their cylinders 33 while the timed introduction of hydraulic fluid under high pressure to high pressure inlets 104 thereof (only one of which is shown in FIG. 1) depresses the pistons 31 to their positions shown in FIGS. 1, 4 and 5.

Referring to FIG. 8, a single flexible hose 103 is provided leading from a manifold 106 to the constant low pressure inlets 102 shown in FIG. 1, and two individual flexible hoses 105 lead from the manifold to the high pressure inlets 104 of the two cylinders 33, the two hoses being provided for individual control from a glassware forming machine timer in the usual manner. These hoses loop downwardly from the lower end of the plunger housing 32 and return upwardly (U-shaped) to the manifold 106 which is stationary relative to the mounting base 38 and the plunger housing cylinder 40 to permit vertical reciprocations of the plunger housing yet provide at all times proper supply of fluid under pressure without interfering with the reciprocation thereof.

FIG. 8 also shows a similar pair of flexible counterblow hoses 108 from the manifold 106 to the bottom of the plunger housing 32, and one of these hoses is shown in FIG. 6 connected pneumatically with one of the counterblow cavities 58 after first passing through a cavity extension 58a. The other hose similarly connects with the other counterblow cavity and the amount of counterblow air to each one may be individually controlled by reason of the separate hose connections and separate control at the glassware forming machine timer.

FIG. 6 also shows how a vacuum connection 110 carried by the stationary plunger housing cylinder 40 and its main cylinder 42. The connection 110 communicates with the vacuum cavity 54 by a cavity extension 54a and a sealed telescoping connection comprising a bore 112 and a tube 114, suitable O-ring sealed.

PRACTICAL OPERATION

In the operation of a glassware forming machine of the blow and blow type such as shown in Youkers and Hamilton patents, the parison molds 18 at a blank station as shown in FIG. 2 of my patent drawings receive the gobs of glass 15 during a time when both the main pistons 44 and the plunger stem pistons 31 are in elevated position as illustrated. It will be noted the neck-forming plungers 12 have been elevated into the guide ring 14 and the split finish ring 16, one of the stop flanges 68 being shown stopped by the stop pads 66 of one of the stop yokes 64, and the sleeves 22 are depressed against the bias of the springs 50 as the upper ends of the sleeves have contacted the lower surfaces of the guide rings 14. The springs thereby bias the upper ends of the sleeves 22 into such contact in this figure and also in FIGS. 3 and 4. At the time illustrated in FIG. 2, the gob vacuum settle operation is in effect, since the transfer ports 62 are now registered with the vacuum ports 56 so that a vacuum is pulled between the plunger 26 and the bore of the guide ring 14. This vacuum is pulled around a pair or guide flanges 12a of the plunger which fit loosely in the guide ring 14, then through ports 12c in the plungers 12, through the head 27, then through the hollow secondary plunger stem 26 and the hollow primary plunger stem 28, the transfer and vacuum ports 62 and 56, the vacuum cavities 54 and 54a, the tube 114, and finally the vacuum connection 114, 110 shown in FIG. 6.

The next operation is to apply the baffle 20 and perform the counterblow operation as in FIG. 4. In FIG. 3, an intermediate position is shown wherein the plungers 12 have been partially retracted so that the transfer ports 62 of the plunger stem 28 are intermediate the vacuum ports 56 and the counterblow ports 60. Thus, the plunger 12 is being readied for the counterblow operation of FIG. 4 wherein the plungers 12 have been depressed their maximum distance relative to the plunger housing 32 and its head 25 to permit counterblowing from the manifold 106, hoses 108, counterblow cavities 58 and their extensions 58a, through the counterblow ports 60 and the transfer ports 62, then upwardly through the hollow stems 28 and 26, and the head 27, through the passages 12c and into the cavity 15a of the gob of glass 15 (shown in FIG. 3), the result being the formation of the parison cavities 15b in the parisons 13 as shown in FIG. 4.

It is now necessary for the entire plunger actuating assembly to be lowered away from the neck ring supported parisons and this is illustrated in FIGS. 1 and 5. High pressure hydraulic fluid is supplied at the inlet 100 from the glassware forming machine timer to lower the assembly from the FIG. 4 position to the FIG. 5 position. First the assembly lowers slightly while the upper ends of the sleeves 22 remain in contact with the lower surfaces of the guide rings 14 (until the flanges on the upper ends of the flanged bushings 48 are engaged by the lower surfaces of inwardly directed stop flanges 21 of the head 25 as shown in FIGS. 1 and 5) and then the plungers 12 are lowered to a position of clearance with respect to the lower ends of the neck rings 16 so that the supporting mechanism for the finish rings, as in the Youkers and Hamilton patents, may revert the parisons so that they can be blown to final shape in the upright position, at a blow station of the machine. Subsequently, after the finish blow, the finished ware is moved to a take-out station and the neck rings 16 are opened for release of the ware. The neck rings are then inverted to the position shown in FIG. 2 for commencing again at the beginning of the cycle as shown in this figure.

By having an individual adjustment for each finish-forming plunger 12 effected through the medium of the stop yokes 64, the adjusting plungers 72 and the adjusting slides 78, each plunger 12 of my double gob plunger actuating mechanism may be nicely adjusted with respect to its neck ring, its parison mold and its guide ring, independent of the other.

I claim as my invention:

1. A plunger actuating assembly for glassware forming machines, said assembly comprising a plunger housing vertically reciprocally movable by the machine, plunger stems vertically reciprocable in said plunger housing, a neck-forming plunger carried by the upper end of each of said plunger stems, a neck ring on said machine, first fluid pressure means to reciprocate said plunger housing, second fluid pressure means for reciprocating each of said plunger stems independent of the other and relative to said plunger housing, and independent means for stopping each of said plunger stems with its neck-forming plunger coacting in a predetermined position with said neck ring of the glassware forming machine and comprising separately adjustable stop elements and stop shoulders on the respective plunger stems for engaging said stop elements under the action of said second fluid pressure means.

2. A plunger actuating assembly in accordance with claim 1 wherein each of said stop elements comprises a pivoted lever, an adjusting plunger engaging its respective lever, spring means effecting such engagement, a slide extending laterally of said adjusting plunger and having an inclined surface engaging the end thereof, and means for sliding said slide.

3. A plunger actuating assembly in accordance with claim 2 wherein said last means comprises a screw which is threaded into said slide and is rotatable and non-slidable relative to said plunger housing.

4. A plunger actuating assembly in accordance with claim 3 wherein means is provided to lock said screw against rotation comprising a flange thereon, a mounting block receiving said flange and having a first portion which is anchored relative to said plunger housing and a second portion which is bendable into contact with said flange, and a clamp screw to effect bending of said second portion.

5. A plunger actuating assembly in accordance with claim 2 wherein a head is provided on said plunger housing on which said pivoted levers are mounted, and in which said adjusting plungers and said slides are slidable, said slides being arranged side by side between said plunger stems.

6. A plunger actuating assembly in accordance with claim 5 wherein the means for sliding said slides comprises screws which are threaded into said slides, rotatable and non-slidable relative to said head and having actuating ends exposed exteriorly of said head, both on the same side thereof and adjacent each other.

7. A plunger actuating assembly in accordance with claim 2 wherein said pivoted levers have yoke ends and said stop shoulders project from opposite sides of said plunger stems and engage the arms of said yoke ends.

8. A plunger actuating assembly in accordance with claim 7 wherein the pivot pin for one lever is located side-by-side with respect to the opposite plunger stem and said levers extend from their pivot pins in opposite directions.

9. A plunger actuating assembly in accordance with claim 1 wherein sleeves are carried by said plunger stems and are engageable under spring pressure bias with guide rings of the glassware forming machine which are located in the neck rings thereof prior to said stop means engaging said stop shoulders.

10. A plunger actuating assembly in accordance with claim 1 wherein means is provided for limiting the reciprocation of said plunger housing comprising a stop against which said housing engages upon said first fluid pressure means reciprocating the plunger housing in a direction for entering said neck-forming plungers into said neck rings.

11. The mechanism of claim 1 wherein said plunger stems are ported and hollowed for the passage of air therethrough, and vacuum and counter-blow ports in said plunger housing coact with the ports of said plunger stems for connecting said plunger stems with a vacuum source and for supplying counter-blow air.

References Cited

UNITED STATES PATENTS

| | | | |
|---|---|---|---|
| 2,063,463 | 12/1936 | Rowe | 65—219X |
| 3,434,821 | 3/1969 | Wiley | 65—320 |

FOREIGN PATENTS

| | | | |
|---|---|---|---|
| 818,405 | 9/1951 | Germany | 65—229 |

ARTHUR D. KELLOGG, Primary Examiner

U.S. Cl. X.R.

65—173, 310, 322